Dec. 29, 1925.
G. F. ZUCKER
1,567,885
VEHICLE SPRING SUSPENSION
Filed July 24, 1924   2 Sheets-Sheet 1
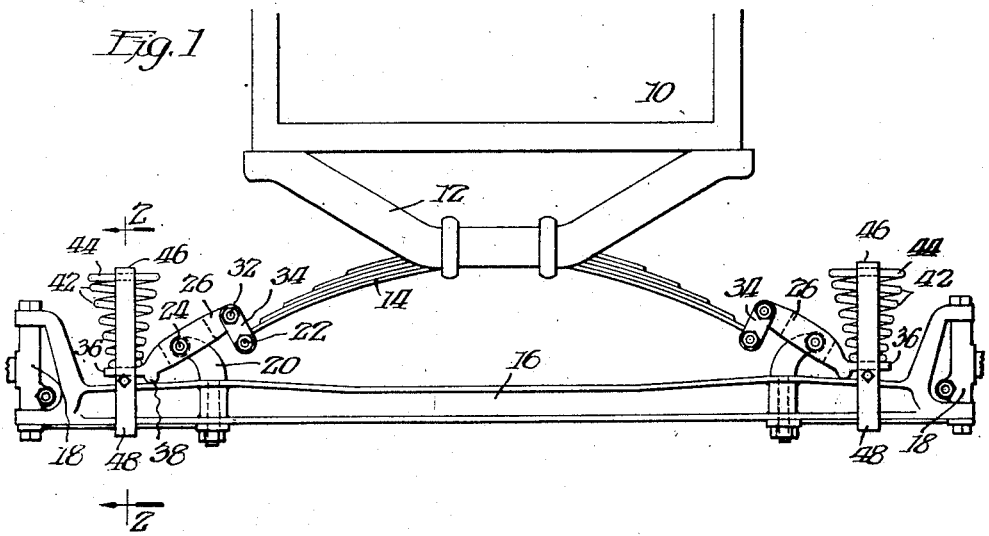
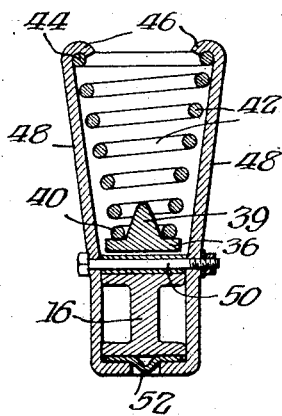
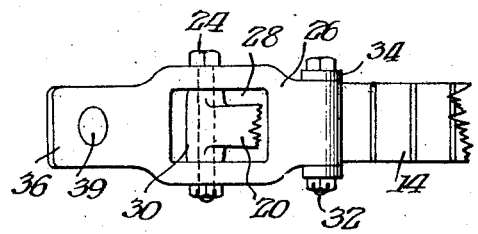
Inventor:
Gottlieb F. Zucker,
By Cheever & Cox
attys.

Dec. 29, 1925.
G. F. ZUCKER
1,567,885
VEHICLE SPRING SUSPENSION
Filed July 24, 1924　　2 Sheets-Sheet 2
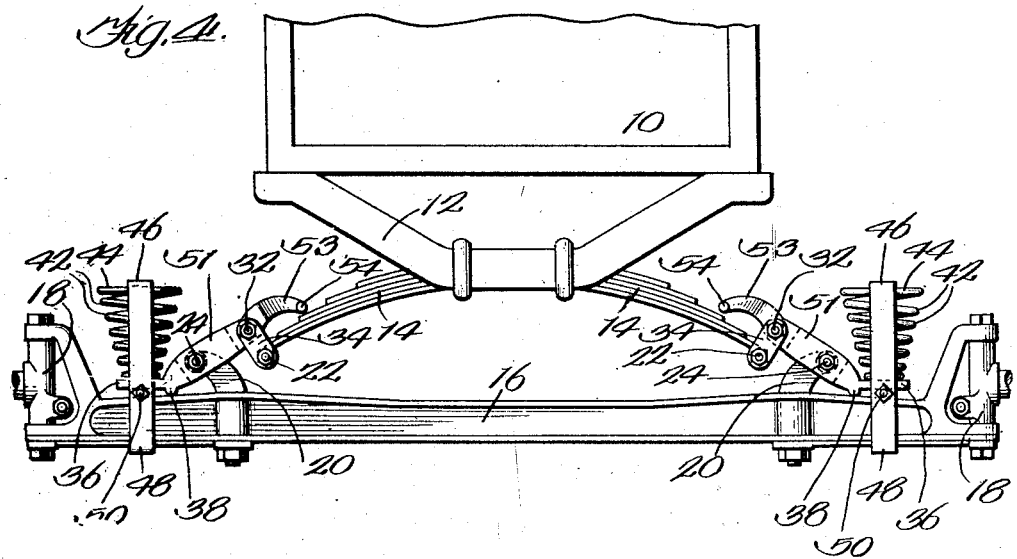
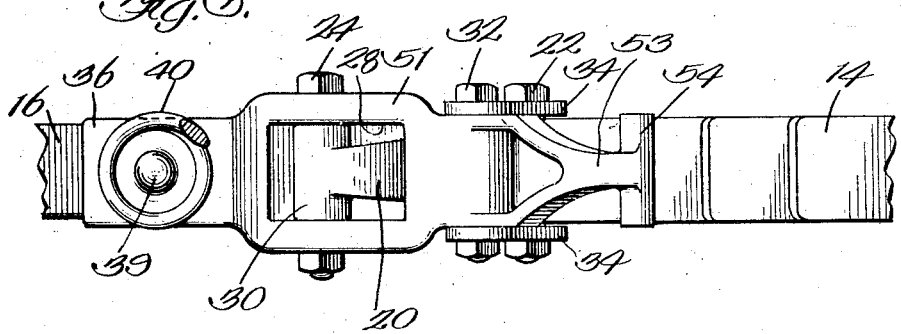
Inventor:
Gottlieb F. Zucker
By Cheever & Cox
Attys Patented Dec. 29, 1925.

1,567,885

UNITED STATES PATENT OFFICE.

GOTTLIEB F. ZUCKER, OF CHICAGO, ILLINOIS.

VEHICLE SPRING SUSPENSION.

Application filed July 24, 1924. Serial No. 728,054.

*To all whom it may concern:*

Be it known that I, GOTTLIEB F. ZUCKER, a citizen of the United States, residing at Chicago, in the county of Cook and State of Illinois, have invented a certain new and useful Improvement in Vehicle Spring Suspensions, of which the following is a specification.

This invention relates to spring mountings for vehicles. Its object is to provide a device of this kind which greatly improves the riding quality of a vehicle equipped with ordinary leaf springs.

The invention consists in means for carrying out the foregoing objects, which can be easily and cheaply made, which is satisfactory in use and not readily liable to get out of order. More particularly, the invention consists in many features and details of construction hereafter more fully set forth in the specification and claims.

In the drawings, where similar numerals indicate the same parts throughout the several views:

Figure 1 is a front elevation of an automobile equipped with the device of this invention in its preferred form.

Figure 2 is a sectional view on the line 2—2 of Figure 1.

Figure 3 is a plan view of an operating lever entering into this invention.

As to everything shown in the foregoing figures, this is a continuation of application, Ser. No. 460,239, filed April 11, 1921.

Figure 4 is a modification of Figure 1, showing a stop for preventing undue upward movement of the main spring and car body carried thereby.

Figure 5 is a plan view at the left hand end of Fig. 4.

Figure 1 shows conventionally the radiator 10; the front frame 12; the front leaf spring 14, the front axle 16 and the wheel supports 18 of an automobile well known in the art in which in normal construction, the posts 20 are turned 180 degrees from the position shown and pivotally attached at 22 to the springs 14.

In carrying out this invention, the posts 20 are released from the springs and turned to the position shown, where there is pivoted to each lever on bolt 24 a lever 26 provided with a slotted opening 28 entered by the head 30 of the support 20. To the end of this lever adjacent to spring 14 is pivoted at 32 a link 34 connected to spring 14 at 22. Owing to the fact that the lever 26 is of symmetrical construction affording bearings for both ends of bolt 24 and is pivoted on bolt 32 between the two bars of link 34 and bears on spring 42 in the central plane of spring 14, the friction on bolts 24 and 32 is even in character and a minimum in quantity. The opposite end of lever 26 is provided with a horizontally extending foot 36 supported by a heel 38 normally striking on axle 16 as shown and stopping the rebound.

Rising from foot 36 is a knob in mound 39 about which rests the smaller end of an inverted conical spring 42 whose upper end 44 is engaged by hooks 46 on the upper ends of oppositely disposed metal clamps 48 secured to the axle 16 by a suitable bolt 50 and kept in place by an angular plate 52. The fact of clamps 48 being stationary and engaging the upper and larger ends of the springs 42 is important in that the spring is never bound sideways by the clamps as would be the case if the contracted ends of the clamps engaged the smaller end of the spring and moved with it.

In the operation of the device, the load at 10 is first transmitted to the leaf springs 14 and thence through levers 26 to the conical springs 42 which augment the action of springs 14 and make the car ride more easily.

By pivoting the upper ends of supports 20 inside levers 26, a very low structure is obtained.

Putting springs 48 on top of axle insures their not being in the way of wheels, lamp bracket and steering devices.

In the modified structure of Figures 4 and 5, lever 26 is replaced by a lever 51 in all respects identical with it except for a spring overlapping stop arm 53 so positioned as to, in normal travel of the vehicle, clear but nevertheless closely approach the upper surface of spring 14 with the result that on any upward bound of the car body 10, the upper surfaces of the spring engage and bear against the knobs 54 on the ends of arms 53 whereby any further movement of the body 10 carries the entire axle mechanism upward thus violently checking the upward movement of the car body. In other words, the presence of arms 53 on levers 26 prevents too free movement of the load on pivots 22 and 32, this irrespective of whether the body 10 tends to move upward or only to rock sideways.

Having thus described my invention, what I claim as new and desire to secure by Letters Patent is:

1. In combination with a vehicle body and its axle, a leaf spring secured to the body, a support rising from the axle, a lever pivoted between its ends to said support, a link connection between the leaf spring and one end of said lever, and a vertically arranged coil spring connected at its upper end with the axle and resting at its lower end on the other end of said lever above the axle, whereby it normally sustains the weight of the body and permits movements of the latter towards the axle irrespective of flexure of said leaf spring.

2. In combination with a vehicle body and its axle, a leaf spring extending in the plane of the axle from the body toward the side of the vehicle, a support rising from the axle beyond the end of the spring, a lever pivoted between its ends to said support, a link connection between the leaf spring and the adjacent end of the lever, a vertically disposed coiled spring sustained at one end by the opposite end of the lever and at its other end by the axle, and a stop on the lever engaging the axle to limit the amount of movement the lever can give the spring.

3. In combination with a vehicle axle, two separated clamping bars rigidly secured to the axle, and extending above the axle, a spring between the bars having one end secured to the outer ends of said clamping bars and its other end adjacent to the axle, a lever pivoted on the axle to one side of the spring having an end entering the clamping bars between the axle and the adjacent end of the spring to engage the latter, and means connecting the other end of said lever to a spring device carried by the car body.

4. In combination with a vehicle axle, a spring inclosing device, secured to the axle and tapering outwardly from the axle, a conical spring inside said enclosing device having its larger end held by the outer end of the enclosing device, a lever pivoted to the axle having one end entering the side of the enclosing device to engage the smaller end of the spring and means connecting the other end of said lever to a spring device carried by the car body.

5. In combination with a vehicle axle, two separated clamping bars rigidly secured to the axle, and extending above the axle, a spring between the bars having one end secured to the outer ends of said clamping bars and its other end adjacent to the axle, a lever pivoted on the axle to one side of the spring having an end entering the clamping bars between the axle and the adjacent end of the spring to engage the latter, and means connecting the other end of said lever to a spring device carried by the car body, and a stop on the lever engaging the axle to limit the amount of movement the lever can give the spring.

6. In combination with a vehicle axle, a spring inclosing device, secured to the axle and tapering outwardly from the axle, a conical spring inside said enclosing device having its larger end held by the outer end of the enclosing device, a lever pivoted to the axle having one end entering the side of the enclosing device to engage the smaller end of the spring and means connecting the other end of said lever to a spring device carried by the car body, and a stop on the lever engaging the axle to limit the amount of movement the lever can give the spring.

7. In combination with a vehicle body and its axle, a leaf spring secured to the body, a support rising from the axle, a lever pivoted between its ends to said support, a link pivoted to the leaf spring and to said lever between its ends whereby an end of the lever overlaps the upper side of the leaf spring and normally closely approaches it, and a spring support between the opposite end of the lever and the axle normally sustaining the weight of the body for the purposes set forth.

8. In combination with a vehicle body and its axle, a leaf spring secured to the body, a support rising from the axle, a lever pivoted between its ends to said support, a link pivoted to the leaf spring and to said lever between its ends whereby an end of the lever overlaps the upper side of the leaf spring and normally closely approaches it, and a vertically arranged coil spring connected at its upper end with the axle and resting at its lower end on the other end of said lever above the axle, whereby it normally sustains the weight of the body and permits movements of the latter towards the axle irrespective of flexure of said leaf spring.

9. In combination with a vehicle body and its axle, a leaf spring secured to the body, a support rising from the axle, a lever pivoted between its ends to said support, a link pivoted to the leaf spring and to said lever between its ends whereby an end of the lever overlaps the upper side of the leaf spring and normally closely approaches it, a vertically disposed coiled spring sustained at one end by the opposite end of the lever and at its other end by the axle, and a stop on the lever engaging the axle to limit the amount of movement the lever can give the spring.

In witness whereof, I have hereunto subscribed my name.

GOTTLIEB F. ZUCKER.